US012358298B2

(12) United States Patent
Hisanaga et al.

(10) Patent No.: US 12,358,298 B2
(45) Date of Patent: Jul. 15, 2025

(54) LIQUID EJECTION APPARATUS

(71) Applicant: CANON KABUSHIKI KAISHA, Tokyo (JP)

(72) Inventors: Akane Hisanaga, Tokyo (JP); Hiroshi Yamada, Kanagawa (JP); Hiroshi Koshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 18/295,460

(22) Filed: Apr. 4, 2023

(65) Prior Publication Data

US 2023/0330998 A1 Oct. 19, 2023

(30) Foreign Application Priority Data

Apr. 19, 2022 (JP) ................................ 2022-068795

(51) Int. Cl.
*B41J 2/175* (2006.01)

(52) U.S. Cl.
CPC ....... *B41J 2/17566* (2013.01); *B41J 2/17513* (2013.01); *B41J 2002/17576* (2013.01)

(58) Field of Classification Search
CPC .... B41J 2/175; B41J 2/17503; B41J 2/17506; B41J 2/17513; B41J 2/1752; B41J 2/17523; B41J 2/17553; B41J 29/38; B41J 2002/17573; B41J 2002/17576; G01F 23/76
See application file for complete search history.

(56) References Cited

U.S. PATENT DOCUMENTS

| | | | | |
|---|---|---|---|---|
| 6,719,415 | B1 * | 4/2004 | Hattori | B41J 2/17566 347/86 |
| 9,724,929 | B2 * | 8/2017 | Yoshii | B41J 2/17553 |
| 12,005,714 | B2 * | 6/2024 | Ono | B41J 2/17523 |
| 2023/0139685 | A1 * | 5/2023 | Koshikawa | B41J 2/1752 347/85 |

FOREIGN PATENT DOCUMENTS

JP 2019-025818 A 2/2019

* cited by examiner

*Primary Examiner* — Anh T Vo
(74) *Attorney, Agent, or Firm* — Canon U.S.A., Inc. IP Division

(57) ABSTRACT

A liquid ejection apparatus is equipped with a liquid ejection head configured to eject a supplied liquid, a storage unit configured to store the liquid to be supplied to the liquid ejection head, a pivot member configured to be dipped in the stored liquid in the storage unit and be revolvable according to the amount of the liquid, and a detection unit configured to detect the amount of the liquid by use of the pivot member, wherein the arrangement position of the detection unit differs according to the specific gravity of the liquid stored in the storage unit.

8 Claims, 7 Drawing Sheets

LIQUID EJECTION APPARATUS

BACKGROUND

Field of the Disclosure

The present disclosure relates to a liquid ejection apparatus that can be widely applied as, for example, an inkjet printing apparatus equipped with a print head capable of ejecting an ink in an inkjet system.

Description of the Related Art

Japanese Patent Laid-Open No. 2019-025818 discloses a technology in which a member equipped with a float is installed in a revolvable manner inside a chamber for storing ink, and pivotal movement of this member is detected by a sensor, so that the remaining amount of the ink inside the chamber is detected. In the technology disclosed in Japanese Patent Laid-Open No. 2019-025818, the buoyancy generated in the float by the stored ink is utilized to pivotally move the pivot member according to the ink remaining amount. Further, in order to generate buoyancy in the float, the float is designed to have a lighter specific gravity than that of the stored ink.

According to the technology disclosed in Japanese Patent Laid-Open No. 2019-025818, a printing apparatus that ejects multiple types of ink needs to be equipped with a chamber for each ink. The buoyancy generated in the float differs depending on the specific gravities of inks. Therefore, if multiple types of ink with specific gravities heavier than the float and different from each other are used in a printing apparatus, the buoyancy generated in each float differs depending on whether the specific gravity of the ink is light or heavy. Accordingly, the amount of pivotal movement of each pivot member according to the ink remaining amount differs depending on the type of ink, and thus there is a possibility that the remaining amounts of ink cannot be accurately detected.

SUMMARY

The present disclosure has been made in view of the above-described problems, so as to provide a technology capable of accurately detecting the remaining amount of a liquid such as an ink.

In the first aspect of the present disclosure, there is provided a liquid ejection apparatus including; a first liquid ejection head configured to supply a first liquid, a first storage unit configured to store the first liquid to be supplied to the first liquid ejection head, a second liquid ejection head configured to eject a second liquid with a specific gravity that is different from that of the first liquid, and a second storage unit configured to store the second liquid to be supplied to the second liquid ejection head, the first storage unit including; a first pivot member configured to be revolvable according to an amount of the stored first liquid, and a first detection unit configured to detect the amount of the first liquid by use of the first pivot member, the second storage unit including; a second pivot member configured to be revolvable according to an amount of the stored second liquid and to move by pivotal movement in a same direction as the first pivot member, and a second detection unit configured to detect the amount of the second liquid by use of the second pivot member, wherein an arrangement position of the first detection unit is different from that of the second detection unit in the direction in which the first pivot member and the second pivot member are moved by pivotal movement.

In the second aspect of the present disclosure, there is provided a liquid ejection apparatus including; a liquid ejection head configured to eject a supplied liquid, a storage unit configured to store the liquid to be supplied to the liquid ejection head, a pivot member configured to be dipped in the stored liquid in the storage unit and be revolvable according to an amount of the liquid, and a detection unit configured to detect the amount of the liquid by use of the pivot member, wherein an arrangement position of the detection unit in a case of storing a first liquid is different from an arrangement position of the detection unit in a case of storing a second liquid whose specific gravity is different from that of the first liquid.

According to the present disclosure, it is possible to accurately detect the remaining amount of an ink.

Further features of the present disclosure will become apparent from the following description of embodiments with reference to the attached drawings.

DESCRIPTION OF THE EMBODIMENTS

Hereinafter, with reference to the accompanying drawings, a detailed explanation is given of an example of a liquid ejection apparatus according to the present disclosure. Note that the following embodiments are not intended to limit the present disclosure, and every combination of the characteristics explained in the embodiments is not necessarily essential to the solution in the present disclosure. Further, the positions, shapes, etc., of the constituent elements described in the present embodiments are merely examples and are not intended to limit this disclosure to the range of the examples.

(Configuration of a Printing Apparatus)

Figure 1A:
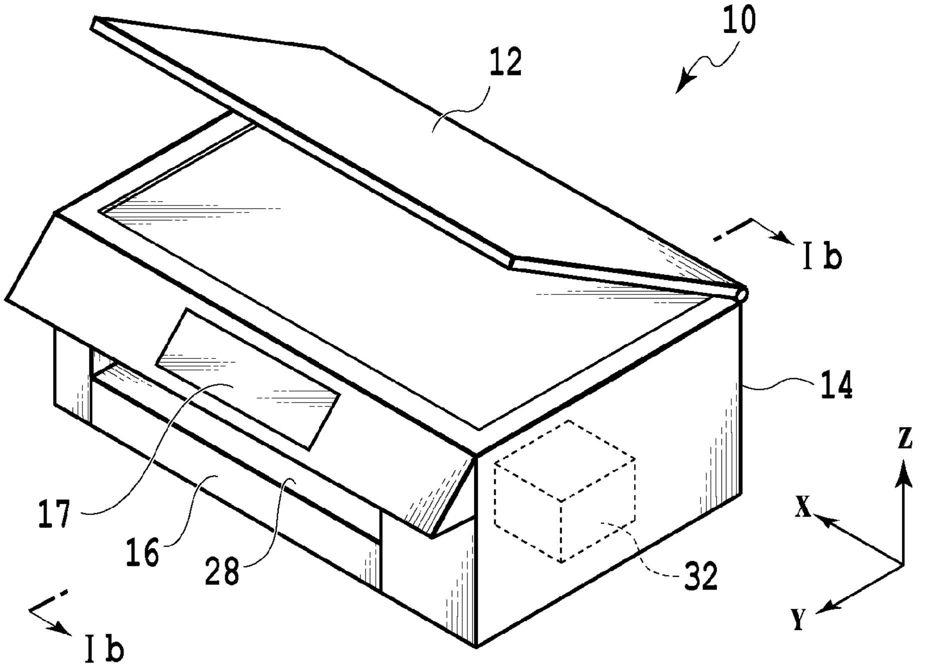
FIG. 1A and FIG. 1B are schematic configuration diagrams of a printing apparatus, which is a liquid ejection apparatus.
Figure 1B:
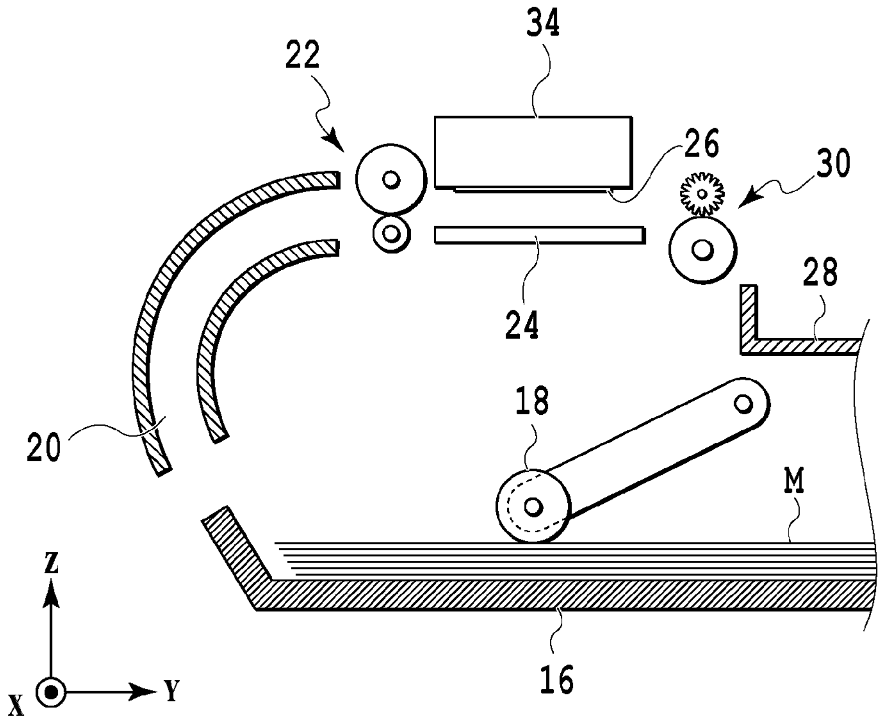

With reference to FIG. 1A and FIG. 1B, an explanation is given of the configuration of a liquid ejection apparatus according to the present embodiments. Note that, in the specification of the present application, a printing apparatus that performs printing by ejecting ink onto a print medium is taken as an example of the liquid ejection apparatus for the sake of explanation. FIG. 1A and FIG. 1B are schematic configuration diagrams of a printing apparatus according to an embodiment. FIG. 1A is a perspective configuration diagram, and FIG. 1B is a diagram illustrating a configuration centered on a printing part inside the apparatus. Note that the printing apparatus 10 of FIG. 1A and FIG. 1B is an example of the printing apparatus to which the present embodiment can be applied, and it is not intended that the printing apparatus to which the present embodiment can be applied is limited to the printing apparatus 10 illustrated in FIG. 1A and FIG. 1B. That is, the present embodiment can be applied to various kinds of apparatuses equipped with various publicly-known printing functions for performing printing by ejecting ink.

The printing apparatus 10 illustrated in FIG. 1A and FIG. 1B is what is termed as a multifunction peripheral equipped with the reading part 12, which is capable of reading a document that is set on a platen glass, and the printing part 14, which performs printing on a print medium, based on information read by the reading part 12, information input from an external apparatus, or the like.

The reading part 12 is located on the upper part of the printing apparatus 10, and the printing part 14 is located on the lower part of the printing apparatus 10. The printing part 14 is equipped with the accommodation tray 16 which accommodates the print medium M, the feeder roller 18 which feeds the print medium M accommodated in the accommodation tray 16, and the guide part 20 which guides the fed print medium M to the printing position at which printing is performed by the print head 26 (described later). Further, the printing part 14 is equipped with the conveyance roller 22 which conveys the print medium M fed via the guide part 20, the platen 24 which supports the print medium M conveyed by the conveyance roller 22, the print head 26 which ejects ink onto the print medium M supported by the platen 24. Moreover, the printing part 14 is equipped with the discharge roller 30 which discharges the print medium M on which printing has been performed to the discharge tray 28 and the ink storage part 32 which is a storage unit that stores the ink to be supplied to the print head 26 via a tube (not illustrated in the drawings).

The print head 26 may be capable of ejecting ink of multiple colors and may be capable of ejecting ink of only one color. Further, such a configuration capable of ejecting a treatment liquid for imparting a predetermined effect to an image after printing is also possible. In a case where multiple types of ink (including a treatment liquid) are ejected, multiple ink storage parts 32 for respectively storing different kinds of ink are to be installed. Further, the print head 26 is mounted on the carriage 34. The carriage 34 is configured to be reciprocally movable in the X direction. The print medium M accommodated in the accommodation tray 16 is conveyed in the −Y direction by the feeder roller 18, made to make a U-turn by the guide part 20, and conveyed in the +Y direction by the conveyance roller 22.

In the printing apparatus 10, the print head 26 ejects ink onto the print medium M supported by the platen 24 while moving via the carriage 34 in the X direction, so as to perform the printing operation for printing corresponding to one scan on the print medium M. Next, the conveyance operation for conveying the print medium by a predetermined amount in the +Y direction so that an area on which printing has not been performed yet is located at the position where the print medium M faces the print head 26 is performed. Thereafter, the printing operation is performed again. In this way, the printing apparatus 10 prints an image on the print medium M by alternately and repeatedly executing the printing operation and the conveyance operation.

(Configuration of the Ink Storage Part)

Figure 2A:
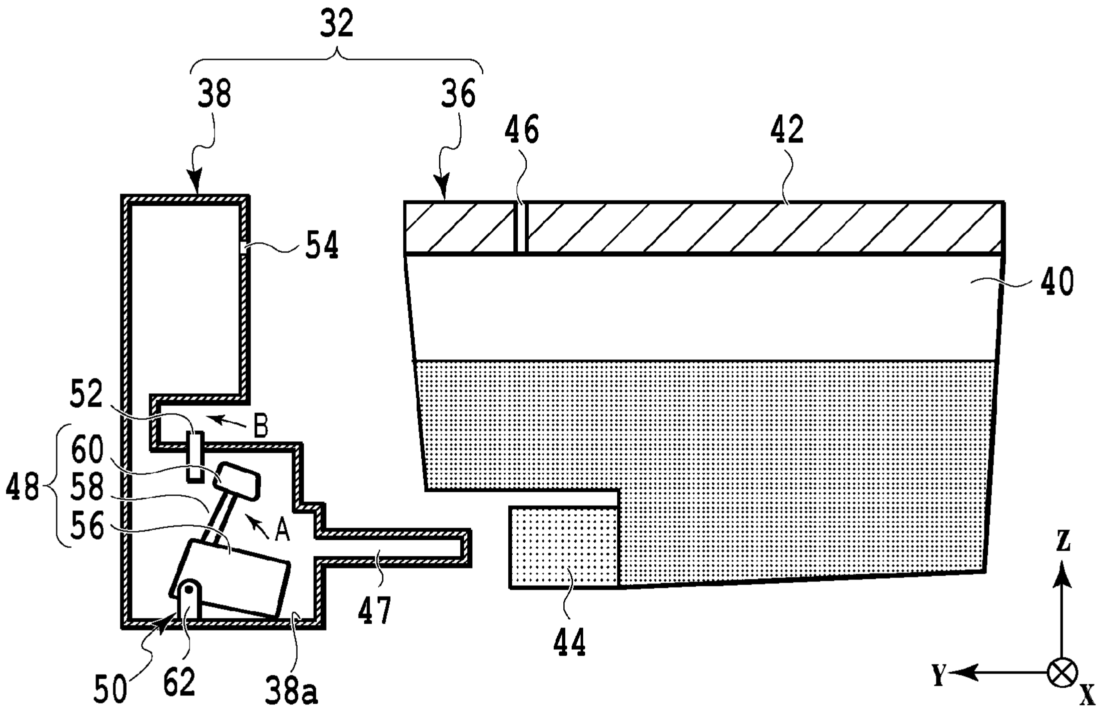
FIG. 2A and FIG. 2B are schematic configuration diagrams of an ink storage part.
Figure 2B:
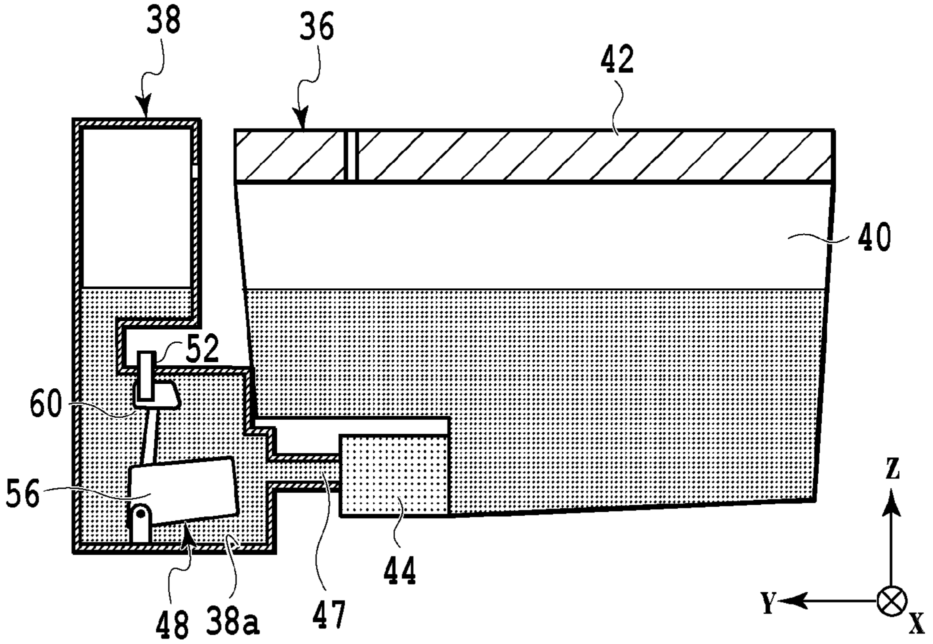

Next, an explanation is given of the configuration of the ink storage part 32. FIG. 2A and FIG. 2B are schematic configuration diagrams of the ink storage part 32. FIG. 2A indicates a state in which the ink containing member 36 is not mounted on the ink chamber 38, and FIG. 2B indicates a state in which the ink containing member 36 is mounted on the ink chamber 38.

The ink storage part 32 is equipped with the ink containing member 36 in which ink is contained and the ink chamber 38 which stores ink contained in the ink containing member 36. The ink containing member 36 is configured to be removable from the ink chamber 38. In the printing apparatus 10, if the ink remaining amount in the ink chamber 38 reaches a certain amount, the user replaces the ink containing member 36 with a new one.

The ink storage part 32 is installed for each type of ink to be ejected from the print head 26. Note that, as described in detail later, the ink chamber 38 has a partially different configuration depending on the type (specific gravity) of ink. Regarding the ink storage part 32, the ink stored in the ink chamber 38 is supplied to the print head 26 via a tube (not illustrated in the drawings). In a case where ink is supplied from the ink chamber 38 to the print head 26 and thus the amount of ink in the ink chamber 38 decreases, ink is supplied to the ink chamber 38 from the connected ink containing member 36.

The ink containing member 36 is equipped with the main body part 40 and the lid part 42. Ink is contained inside the main body part 40. Further, at the bottom part of the main body part 40, the supply part 44 to be connected to the connecting member 47 (described later) of the ink chamber 38 so as to be capable of supplying ink to the ink chamber 38 is installed. That is, in the present embodiment, the ink containing member 36 is configured to be removable from the ink chamber 38 via the supply part 44. The supply part 44 is equipped with an open-close mechanism such as a valve spring structure. The lid part 42 is formed with the air communication port 46 that allows the inside and the outside of the ink containing member 36 to communicate with each other.

The ink chamber 38 is equipped with the connecting member 47 to be connected to the ink containing member 36 via the supply part 44. At the bottom part 38*a* inside the ink chamber 38, the pivot member 48 is installed. The pivot member 48 is supported in a revolvable manner by the support member 50 at the bottom part 38*a*. Therefore, in a case where the ink is supplied to the ink chamber 38, the pivot member 48 is to be dipped in the ink. Further, in the ink chamber 38, the sensor 52 capable of detecting a pivotal movement of the pivot member 48 is installed above the pivot member 48. Note that, although the sensor 52 is installed in the ink chamber 38, there is not such a limitation, and, as long as the sensor 52 is configured to be capable of detecting a pivotal movement of the pivot member 48, the sensor 52 and the ink chamber 38 may be installed separately. Further, in the ink chamber 38, the air communication port 54 that allows the inside and the outside of the ink chamber 38 to communicate with each other is formed at a position that the liquid surface of the stored ink does not reach.

The pivot member 48 is equipped with the float 56 extending in the Y direction, the arm part 58 extending upward (approximately Z direction) from the float 56, and the detected part 60 located at the tip of the arm part 58. The float 56 is equipped with a predetermined width in the X direction and is formed of a material with a specific gravity lower than that of the ink contained in the ink containing member 36. Further, at the lower part on one side (on the downstream side in the +Y direction) of the extending direction (Y direction), the float 56 is supported in a revolvable manner by the shaft 62 which extends in the X direction in the support member 50. The detected part 60 is located above the float 56 via the arm part 58. Therefore, the detected part 60 is configured to be movable according to the pivotal movement of the float 56. The detected part 60 is formed of a material that can be detected by the sensor 52. Note that, as described later, since the sensor 52 is an optical sensor equipped with a light-emitting part and a light-receiving part in the present embodiment, the detected part 60 is formed of a material that blocks or attenuates the light from the light-emitting part. The arm part 58 and the detected part 60 may be formed of the same material as the float 56, for example.

The sensor 52 is a detection unit that detects a pivotal movement of the pivot member 48, in order to optically detect that the height of the liquid surface of the ink stored in the ink chamber 38 has fallen below a predetermined position. Note that, if the height of the liquid surface of the ink falls below the predetermined position, the printing apparatus 10 determines that the amount of the ink stored in the ink chamber 38 has reached a predetermined amount or less. More specifically, the sensor 52 is equipped with a light-emitting part (not illustrated in the drawings) and a light-receiving part (not illustrated in the drawings). In FIG. 2A and FIG. 2B, the light-emitting part and the light-receiving part are arranged so as to face each other with a space in the X direction. Note that, in a case where the pivot member 48 makes a pivotal movement, the detected part 60 passes between the light-emitting part and the light-receiving part. Further, the sensor 52 outputs different detection signals according to the light received by the light-receiving part out of the light output from the light-emitting part.

Specifically, for example, in a case where the light output from the light-emitting part cannot be received by the light-receiving part, that is, in a case where the received-light strength is lower than predetermined strength, the sensor 52 outputs a low-level signal, which represents a signal of a signal level lower than a threshold level. The output low-level signal is received by a control part (not illustrated in the drawings) mounted on the main PCB (not illustrated in the drawings). The control part that has received the low-level signal detects that the height of the liquid surface of the ink is at or above a predetermined position.

On the other hand, in a case where the light output from the light-emitting part can be received by the light-receiving part, that is, in a case where the received-light strength is equal to or higher than the predetermined strength, the sensor 52 outputs a high-level signal, which represents a signal of a signal level equal to or higher than the threshold level. The output high-level signal is received by the control part, and the control part detects that the height of the liquid surface of the ink is below the predetermined position.

In a case where the ink containing member 36 is connected to the connecting member 47 of the ink chamber 38 with no ink stored (see FIG. 2A) via the supply part 44, the ink inside the ink containing member 36 flows to the inside of the ink chamber 38 via the supply part 44 and the connecting member 47. In a case where a certain amount of ink is stored in the ink chamber 38, the buoyancy that acts on the float 56, which has a lower specific gravity than that of the ink, exceeds the gravity, so that the pivot member 48 (float 56) pivotally moves in the direction of Arrow A. By this pivotal movement of the pivot member 48 in the direction of Arrow A, the detected part 60 moves in the direction of Arrow B.

Further, in a case where the height of the liquid surface of the ink in the ink chamber 38 reaches or exceeds the predetermined position due to a further inflow of ink, the detected part 60 moves in the direction of Arrow B to the position between the light-emitting part and the light-receiving part of the sensor 52. By the height of the liquid surface of the ink in the ink chamber 38 reaching or exceeding the predetermined position, it indicates, in other words, that ink of a predetermined amount or more is stored in the ink chamber 38. Note that, during the time in which the height of the liquid surface of the ink is at or above the predetermined position, the detected part 60 stays between the light-emitting part and the light-receiving part (see FIG. 2B). In this way, in a case where the height of the liquid surface of the ink is at or above the predetermined position, since the light output from the light-emitting part is not received by the light-receiving part (or is attenuated before reaching the light-receiving part) with the detected part 60, the sensor 52 outputs the low-level signal to the control part. Accordingly, the control part detects that the height of the liquid surface of the ink is at or above the predetermined position.

(Operation of the Pivot Member at the Time of an Ink Decrease)

Figure 3A:
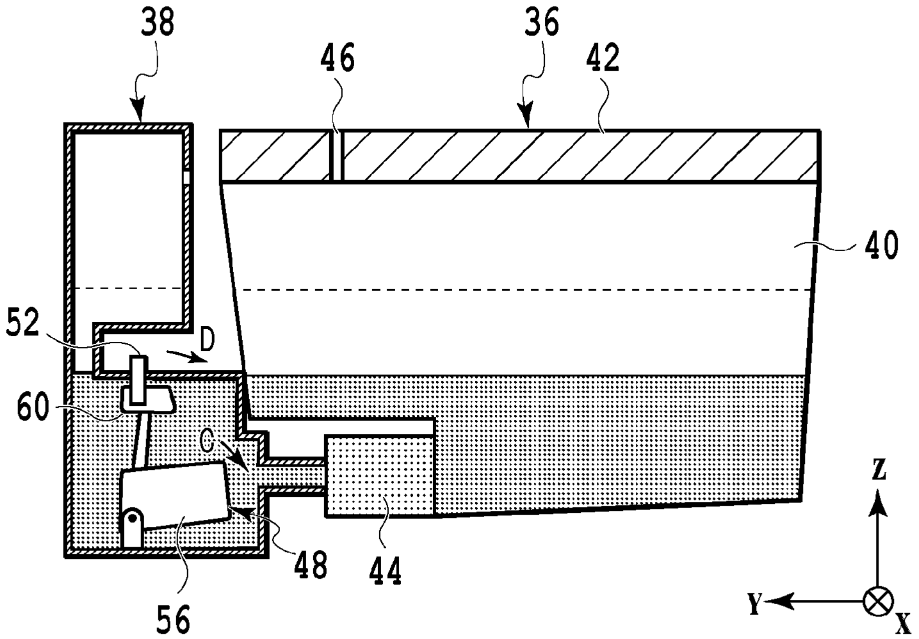
FIG. 3A and FIG. 3B are diagrams illustrating the movement of a pivot member at the time of an ink decrease.
Figure 3B:
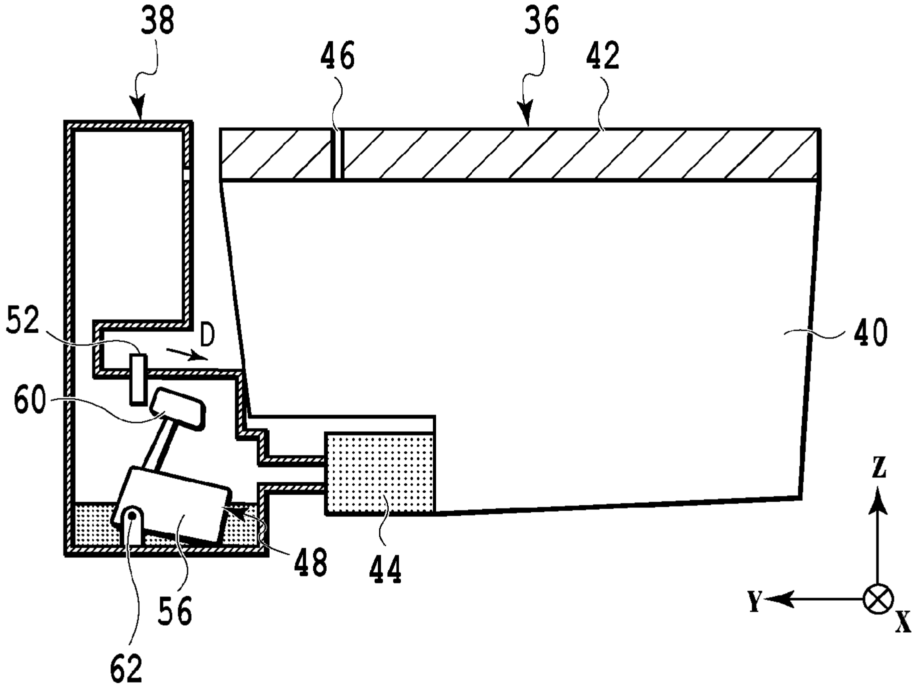

Next, an explanation is given of the operation of the pivot member 48 in a case where the ink in the ink chamber 38 has decreased. FIG. 3A and FIG. 3B are diagrams for explaining the operation of the pivot member 48 in a case where the ink in the ink chamber 38 has decreased. FIG. 3A is a diagram illustrating the pivot member 48 in a case where the liquid surface of the ink in the ink chamber 38 is at or above the predetermined position, and FIG. 3B is a diagram illustrating the pivot member 48 in a case where the liquid surface of the ink in the ink chamber 38 is below the predetermined position.

Due to a supply of ink from the ink chamber 38 to the print head 26, the amount of ink inside the ink chamber 38 and the ink containing member 36 decreases, and thus the liquid surface of the ink in the ink chamber 38 is lowered (see FIG. 3A). In a case where the amount of ink in the ink chamber 38 decreases and the amount of stored ink becomes less than a certain amount, the gravity exceeds the buoyancy acting on the float 56. Accordingly, the pivot member 48 (float 56) pivotally moves in the direction of Arrow C. By this pivotal movement of the pivot member 48 in the direction of Arrow C, the detected part 60 moves in the direction of Arrow D.

Then, in a case where the height of the liquid surface of the ink in the ink chamber 38 falls below the predetermined position due to a further supply of the ink to the print head 26, the detected part 60 moves in the direction of Arrow D to a position where the detected part 60 is retracted from between the light-emitting part and the light-receiving part of the sensor 52. Note that, during the time in which the height of the liquid surface of the ink is below the predetermined position, the detected part 60 stays in a position where the detected part 60 is retracted from between the light-emitting part and the light-receiving part, that is, a position where the detected part 60 is retracted from the sensor 52 is maintained (see FIG. 3B). In this way, in a case where the height of the liquid surface of the ink is below the predetermined position, since the light that is output from the light-emitting part can be received by the light-receiving part (or is not attenuated before reaching the light-receiving part) with the detected part 60, the sensor 52 outputs the high-level signal to the control part. Accordingly, the control part detects that the height of the liquid surface of the ink is below the predetermined position.

Here, at the point in time where the printing apparatus 10 detects that the height of the liquid surface of the ink has fallen below the predetermined position, a notification for prompting the user to replace the ink containing member 36 is provided to the display part 17 (see FIG. 1A) which is installed on the printing apparatus 10, for example. The user normally checks the notification displayed on the display part 17 and replaces the ink containing member 36. However, since a small amount of ink still remains in the ink chamber 38, it is possible to perform printing on a certain number of sheets after detecting that the height of the liquid surface of the ink has fallen below the predetermined position. For this reason, the printing apparatus 10 counts the number of ejected ink droplets from the point in time where it is detected that the height of the liquid surface of the ink has fallen below the predetermined position. Then, at the timing where the counted value becomes such that ink cannot be supplied from the ink chamber 38 to the print head 26, a notification that the ink has run out is provided.

By the way, in recent years, the types of ink used in printing apparatuses have become versatile, and one printing apparatus may be configured to be capable of using multiple types of ink. For this reason, in a case where the ink storage parts 32 with exactly the same configuration are arranged so as to correspond to the respective inks in a printing apparatus, the inks may have different specific gravities depending on the types of ink, which results in differences in buoyant exerted on the floats. Accordingly, there is a possibility that it is not possible to accurately detect that the height of the liquid surface of an ink has fallen below the predetermined position.

Figure 4A:
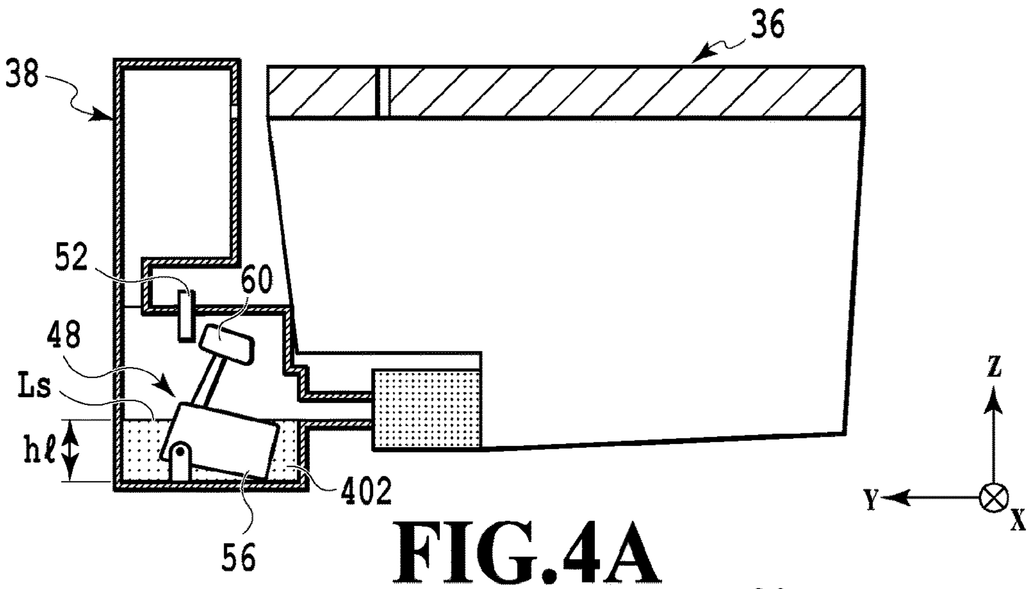
FIG. 4A to FIG. 4C are diagrams illustrating liquid surface heights determined to be below a predetermined position for inks with different specific gravities.
Figure 4B:
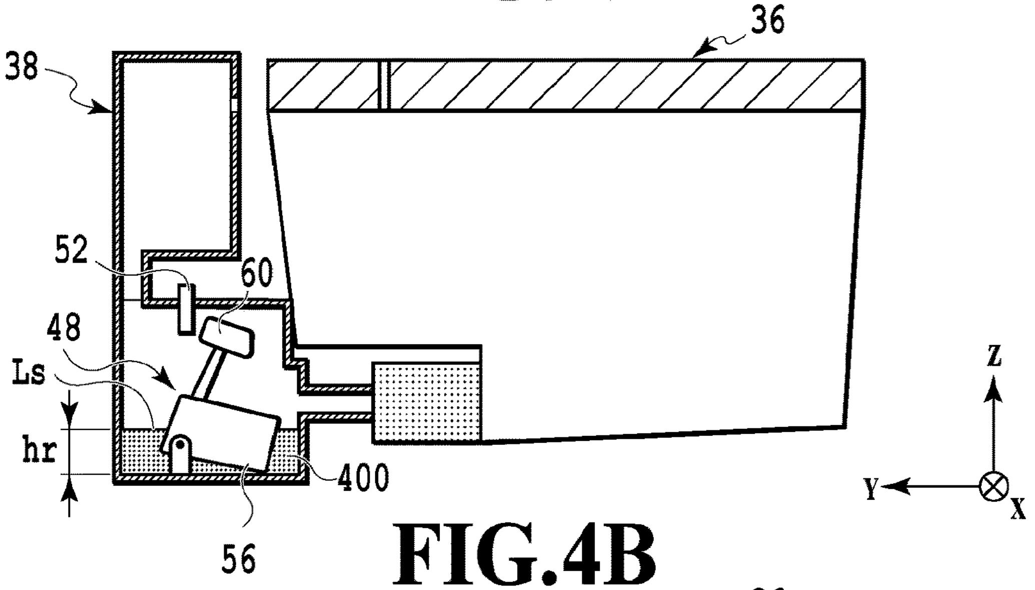
Figure 4C:
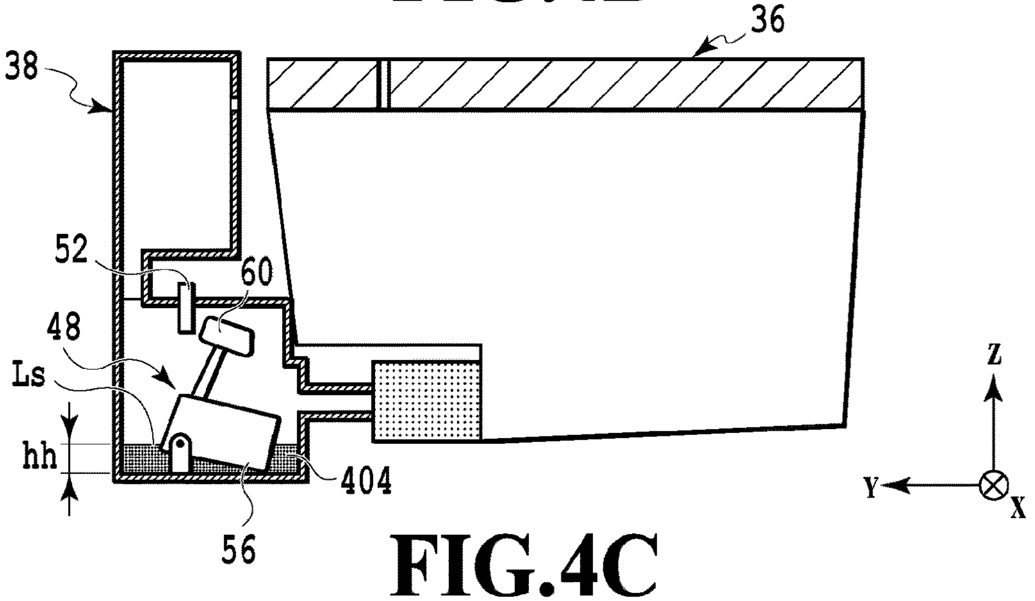

With reference to FIG. 4A to 4C, a detailed explanation is given of such a case in which it is not possible to accurately detect that the heights of the liquid surfaces of inks have fallen below the predetermined position due to differences in the specific gravities of the inks. FIG. 4A to FIG. 4C are diagrams illustrating the differences in the states of pivot members and the ink remaining amounts in a case of using inks with different specific gravities. FIG. 4A indicates the case of using an ink with a specific gravity lower than a reference specific gravity by a certain amount, FIG. 4B indicates the case of using an ink with the reference specific gravity, and FIG. 4C indicates the case of using an ink with a specific gravity higher than the reference specific gravity by a certain amount. Note that, in the explanation using FIG. 4A to FIG. 4C, the pivot member 48 being used has a specific gravity with which, in a case of using the ink 400 with the reference specific gravity, it can be accurately detected that the height of the liquid surface of the ink 400 in the ink chamber 38 has fallen below a predetermined position. Further, the pivot member 48 (float 56) has a specific gravity lower than that of the ink 402 which has a specific gravity lower than that of the ink 400 with the reference specific gravity by a certain amount. In FIG. 4A to FIG. 4C, the liquid surfaces at the timings where the detected parts 60 are retracted from the sensors 52 are illustrated. However, regarding the positions of the sensors 52 and the detected parts 60 at these timings, the detected parts 60 are clearly separated from the sensors 52 in the illustrations for ease of understanding.

In the case of using the ink 400 with the reference specific gravity, if the liquid surface Ls of the ink 400 reaches the height hr in the ink chamber 38, the detected part 60 of the pivot member 48 that has pivotally moved is in the state of being retracted from the sensor 52 (see FIG. 4B). Here, in the printing apparatus 10, it is detected that the height of the liquid surface of the ink has fallen below a predetermined position. That is, in this case, the buoyant generated in the pivot member 48 is smaller than the gravity acting on the pivot member 48 at the height hr. In the explanation using FIG. 4A to FIG. 4C, it is indicated that the liquid surface Ls that has fallen below the predetermined position can be properly detected in this case. In other words, in the explanation using FIG. 4A to FIG. 4C, the proper height of the liquid surface Ls that falls below the predetermined position is the height hr.

In the case of using the ink 402 which has a specific gravity lower than that of the ink 400 with the reference specific gravity, if the liquid surface Ls of the ink 402 reaches the height h1 in the ink chamber 38, the detected part 60 of the pivot member 48 that has pivotally moved is in the state of being retracted from the sensor 52 (see FIG. 4A). That is, in this case, the buoyant generated in the pivot member 48 (float 56) is smaller than the gravity acting on the pivot member 48 at the height h1, which is higher than the proper height hr. Therefore, in the printing apparatus 10, if the liquid surface Ls reaches the height h1 which is higher than the height hr, it is detected that the height of the liquid surface of the ink has fallen below the predetermined position. Here, the ink 402 has a lower specific gravity than the ink 400. Therefore, in the ink chamber 38, the buoyant generated in the pivot member 48 (float 56) with the ink 402 is smaller than the buoyant generated in the pivot member 48 with the ink 400. Accordingly, if the liquid surface height reaches the height h1 with a relatively large ink remaining amount, the detected part 60 gets in the state of being retracted from the sensor 52.

In the case of using the ink 404 which has a specific gravity higher than that of the ink 400 with the reference specific gravity, if the liquid surface Ls of the ink 404 reaches the height hh in the ink chamber 38, the detected part 60 of the pivot member 48 that has pivotally moved is in the state of being retracted from the sensor 52 (see FIG. 4C). That is, in this case, the buoyant generated in the pivot member 48 is smaller than the gravity acting on the pivot member 48 at the height hh, which is lower than the proper height hr. Therefore, in the printing apparatus 10, if the liquid surface Ls reaches the height hh which is lower than the height hr, it is detected that the height of the liquid surface of the ink has fallen below the predetermined position. Here, the ink 404 has a higher specific gravity than the ink 400. Therefore, in the ink chamber 38, the buoyant generated in the pivot member 48 with the ink 404 is larger than the buoyant generated in the pivot member 48 with the ink 400. Accordingly, if the liquid surface height reaches the height hh with a small ink remaining amount, the detected part 60 gets in the state of being retracted from the sensor 52.

In this way, if the ink chamber 38 with the same configuration is used for inks with different specific gravities, the liquid surface heights to be detected as being below the predetermined position, that is, the liquid surface heights at which the detected part 60 is in the state of being retracted from the sensor 52, change depending on the specific gravities of the inks. The printing apparatus 10 is configured to count the number of ejected ink droplets after providing the notification for prompting replacement of the ink containing member 36 and then provide a notification that the ink has run out if reaching a predetermined count. Therefore, the ink may run out before the timing of notifying that the ink has run out or there may still be a printable amount of ink at that timing.

(Characteristic Configuration of the Present Embodiment)

Figure 5A:
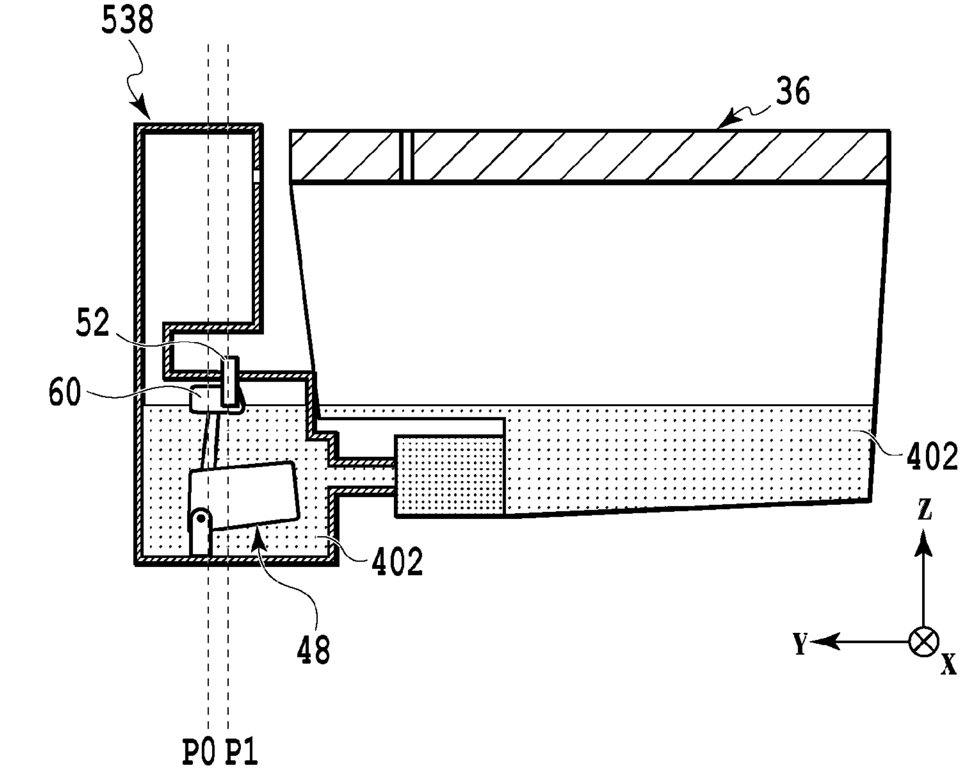
FIG. 5A and FIG. 5B are diagrams illustrating the arrangement position of a sensor in a case of an ink with a low specific gravity.
Figure 5B:
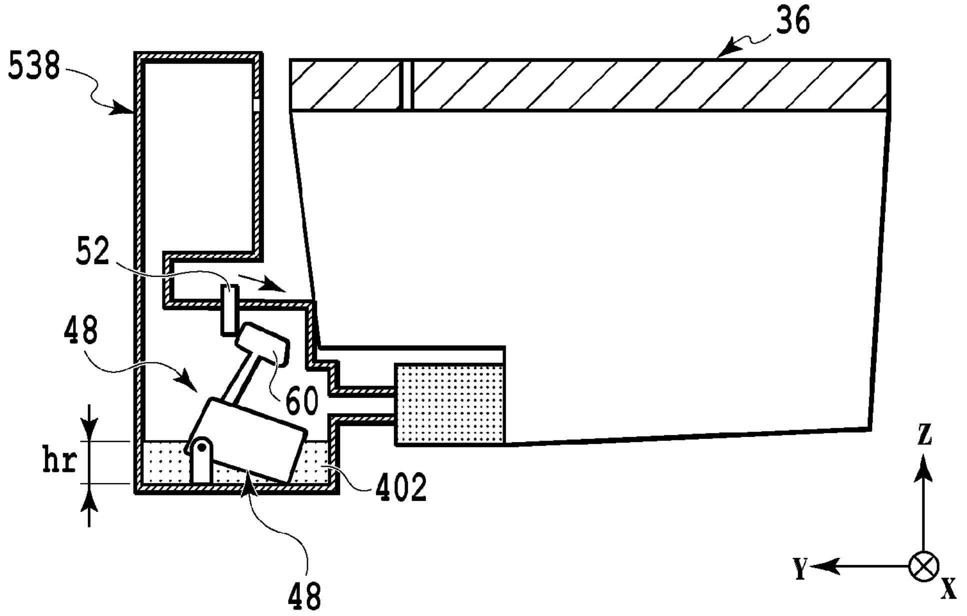
Figure 6A:
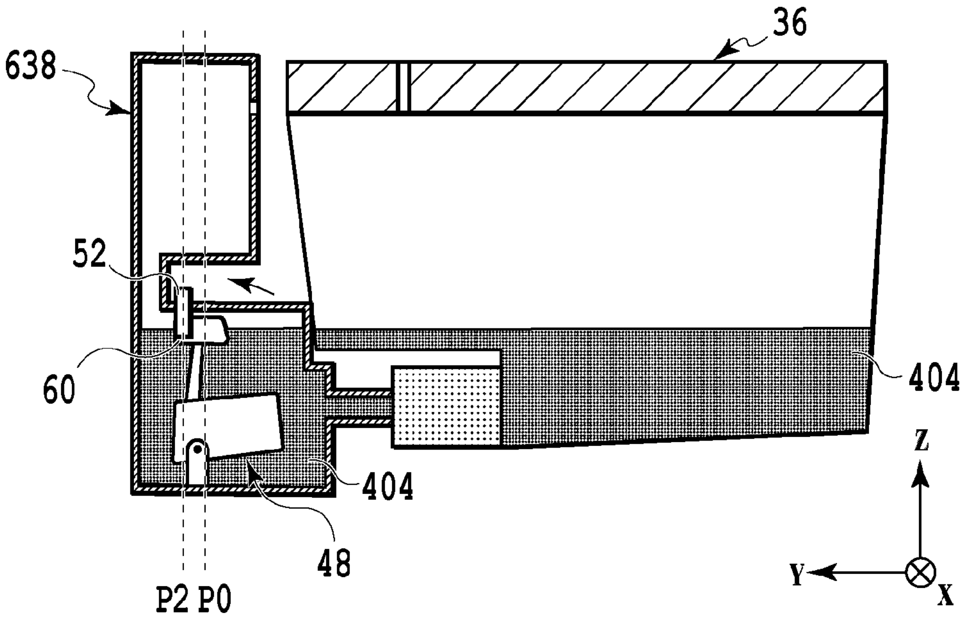
FIG. 6A and FIG. 6B are diagrams illustrating the arrangement position of the sensor in a case of an ink with a high specific gravity.
Figure 6B:
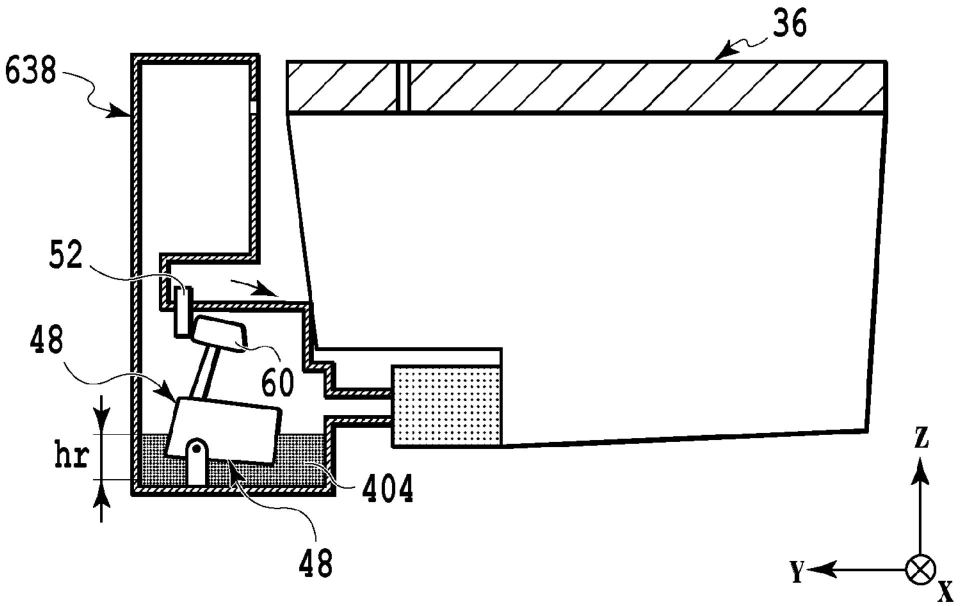

Therefore, in the present embodiment, the arrangement position of the sensor 52 is changed according to the specific gravity of the ink. Hereinafter, a detailed explanation is given with reference to FIG. 5A to FIG. 6B. FIG. 5A and FIG. 5B are diagrams illustrating the positions of the sensor in the case of using an ink with a low specific gravity. FIG. 5A is a diagram illustrating the positional relationship between the sensor and the detected part in a case where the liquid surface height of the ink is at or above a predetermined position. FIG. 5B is a diagram illustrating the positional relationship between the sensor and the detected part in a case where the liquid surface height of the ink is below the predetermined position. FIG. 6A and FIG. 6B are diagrams illustrating the positions of the sensor in the case of using an ink with a high specific gravity. FIG. 6A is a diagram illustrating the positional relationship between the sensor and the detected part in a case where the liquid surface height of the ink is at or above a predetermined position. FIG. 6B is a diagram illustrating the positional relationship between the sensor and the detected part in a case where the liquid surface height of the ink is below the predetermined position.

As described above, the buoyancy exerted on the pivot member 48 by the ink 402 with a lower specific gravity than the ink 400 with the reference specific gravity is smaller than the buoyancy exerted on the pivot member 48 by the ink 400. Therefore, the rotation angle of the pivot member 48 associated with ink decrease is larger. Therefore, in the present embodiment, the arrangement position of the sensor 52 is moved toward the direction in which the detected part 60 moves at the time of an ink decrease. That is, in the ink chamber 538 that stores the ink 402 with a low specific gravity, the arrangement position of the sensor 52 is on the further upstream side in the +Y direction, compared to the arrangement position of the sensor 52 in the ink chamber 38 that stores the ink 400 with the reference specific gravity (see FIG. 4B, FIG. 5A, and FIG. 5B).

Specifically, in the ink chamber 538, the sensor 52 is arranged at such a position that the detected part 60 gets retracted from between the light-emitting part and the light-receiving part if the liquid surface height of the ink 402 with a low specific gravity reaches the height hr (see FIG. 5B). Note that, with respect to the Y direction, the displacement amount of the arrangement position P1 of the sensor 52 in the ink chamber 538 relative to the arrangement position P0 of the sensor 52 in the ink chamber 38 changes according to the specific gravity of the ink 402 relative to the ink 400 with the reference specific gravity.

Further, as described above, the buoyancy exerted on the pivot member 48 by the ink 404 with a higher specific gravity than the ink 400 with the reference specific gravity is larger than the buoyancy exerted on the pivot member 48 by the ink 400. Therefore, the rotation angle of the pivot member 48 associated with ink decrease is smaller.

Therefore, in the present embodiment, the arrangement position of the sensor 52 is moved toward the opposite side of the direction in which the detected part 60 moves at the time of an ink decrease. That is, in the ink chamber 638 that stores the ink 404 with a high specific gravity, the arrangement position of the sensor 52 is on the further downstream side in the +Y direction, compared to the arrangement position of the sensor 52 in the ink chamber 38 that stores the ink 400 with the reference specific gravity (see FIG. 6A and FIG. 6B).

Specifically, in the ink chamber 638, the sensor 52 is arranged at such a position that the detected part 60 gets retracted from between the light-emitting part and the light-receiving part if the liquid surface height of the ink 404 with a high specific gravity reaches the height hr (see FIG. 6B). Note that, with respect to the Y direction, the displacement amount of the arrangement position P2 of the sensor 52 in the ink chamber 638 relative to the arrangement position P0 of the sensor 52 in the ink chamber 38 changes according to the specific gravity of the ink 404 relative to the ink 400 with the reference specific gravity.

As described above, in the present embodiment, the arrangement position of the sensor 52 is different in the Y direction depending on the specific gravity of ink. Therefore, in order to cope with such differences in the arrangement position of the sensor 52 in the Y direction, the detected part 60 of the pivot member 48 has a shape extending in the Y direction. Specifically, the detected part 60 is formed so as to extend respectively toward the upstream side and the downstream side in the +Y direction from the portion connecting to the arm part 58. Further, with respect to each arrangement position of the sensor 52 according to the specific gravity of the ink, the detected part 60 has a form so as to get retracted from between the light-emitting part and the light-receiving part of the sensor 52 in a case where the liquid surface height of the ink is at or below the height hr and so as to get positioned therebetween in a case where the liquid surface height is above the height hr.

As explained above, in the present embodiment, the arrangement position of the sensor 52 capable of detecting the detected part 60 which moves according to the height of the liquid surface of the ink in an ink chamber is changed according to the specific gravity of the stored ink. Specifically, as the specific gravity of the ink is lower, the arrangement position of the sensor 52 is positioned further to the direction in which the detected part 60 moves according to the pivotal movement of the pivot member 48 associated with ink decrease. Accordingly, in the printing apparatus 10, the sensor 52 can detect that the liquid surface height has fallen below the predetermined position at the same liquid surface height regardless of the specific gravity of the ink, which makes it possible to accurately detect the remaining amount of the ink.

Other Embodiments

Note that the above-described embodiment may be modified as shown in the following (1) through (7).

(1) Although not specifically described in the above embodiment, the sensor 52 is arranged integrally with an ink chamber, for example. However, the layout in the ink chamber is not limited to as described above. For example, in the ink chamber, multiple notch parts may be formed along the Y direction, so that the sensor 52 is fixed to a predetermined notch part according to the specific gravity of the ink to be stored. In this way, with such a configuration of fixing the sensor 52 to any of multiple fixation portions installed in an ink chamber, the ink chamber can be formed using the same components regardless of the specific gravity of ink, and thus it is possible to suppress an increase in manufacturing costs.

Figure 7A:
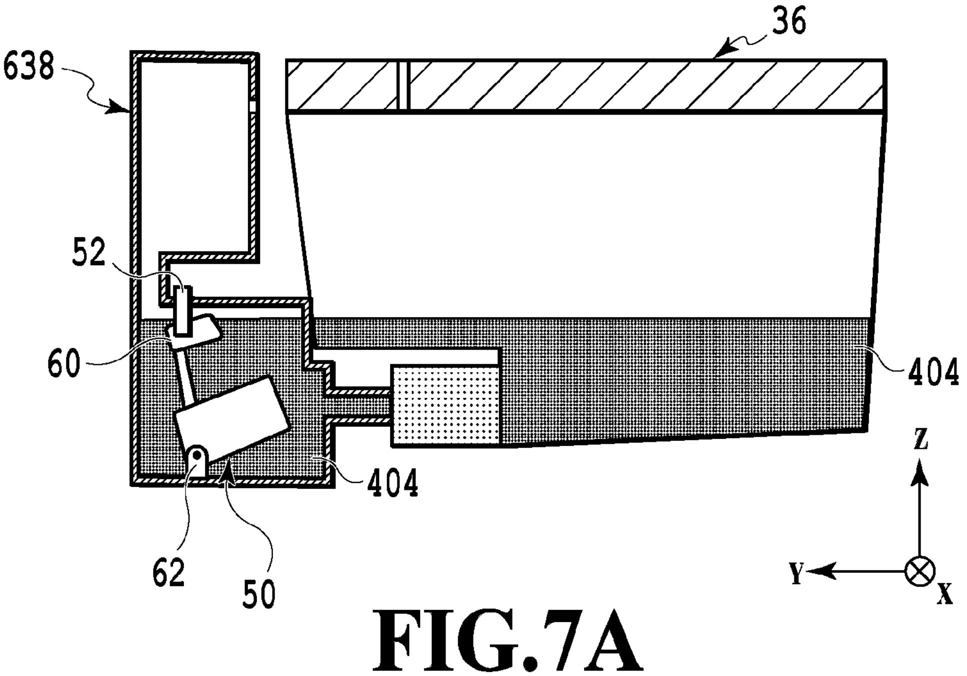
FIG. 7A and FIG. 7B are diagrams illustrating an ink storage part equipped with a pivot member as a modification example.
Figure 7B:
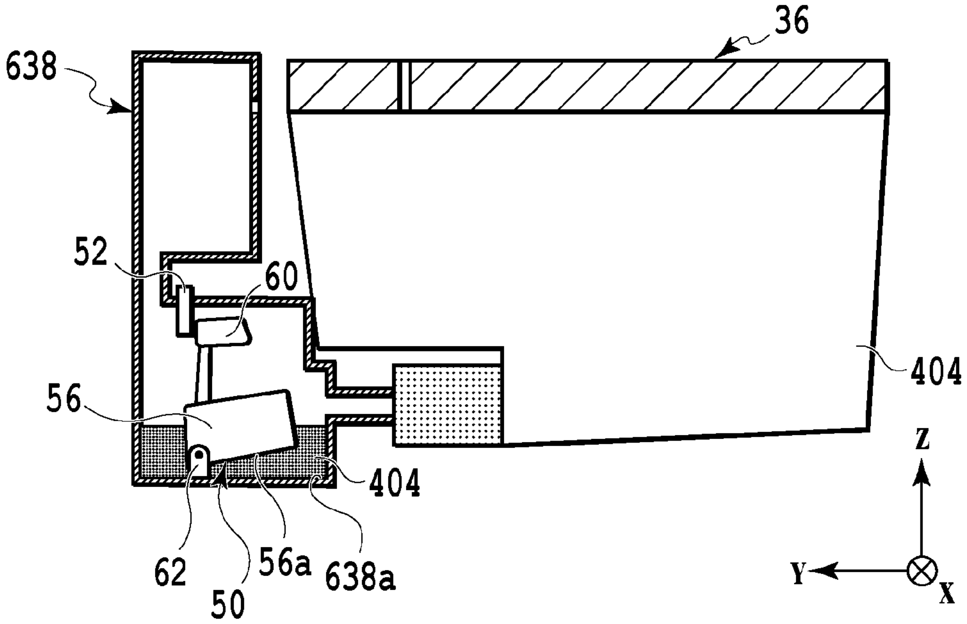

(2) In the above-described embodiment, although the detected part 60 of the pivot member 48 has a shape extending respectively toward the upstream side in the +Y direction and the downstream side in the +Y direction from the position connecting to the arm part 58, there is not such a limitation. That is, for example, the detected part 60 may have a shape that extends biasedly toward the upstream side in the +Y direction from the position connecting to the arm part 58 (see FIG. 7A and FIG. 7B). FIG. 7A and FIG. 7B are diagrams illustrating a state equipped with a pivot member of a modification example in an ink chamber that stores an ink with a high specific gravity. FIG. 7A is a diagram illustrating a state in which sufficient ink is stored in the ink chamber. FIG. 7B is a diagram illustrating a state in which the liquid surface height of the stored ink has fallen below a predetermined position, which is equal to or lower than the height hr.

By forming the detected part 60 to have a shape that extends biasedly to the upstream side in the +Y direction, at the time where the liquid surface height of the ink 404 is at the height hr, which is to be determined as being below the predetermined position, the bottom surface 56*a* of the float 56 does not make contact with the bottom part 638*a* of the ink chamber 638. Accordingly, the shaft 62 of the support member 50 serving as the pivot axis of the pivot member 48 can be positioned lower in the height direction (Z direction), that is, the shaft 62 can be positioned closer to the bottom part 638*a*. Therefore, it is possible to downsize the ink chamber 638 in the height direction.

(3) Although the pivot member 48 is installed in the ink chamber 38 in the above-described embodiment, there is not such a limitation. That is, it is also possible that the pivot member 48 is installed in the ink containing member 36. In this case, in the state where the ink containing member 36 is connected to the ink chamber 38, the sensor 52 is installed so as to be capable of detecting the pivot member 48 that is installed in the ink containing member 36. Note that, here, as in the above-described embodiment, the sensor 52 is arranged at a position corresponding to the specific gravity of the ink.

(4) The above-described embodiment is not only applied to a printing apparatus that performs printing on a print medium by ejecting ink from a print head but can be widely applied as a liquid ejection apparatus that performs various kinds of processes by ejecting various liquids from a liquid ejection head. Further, in the above-described embodiment, although the printing apparatus 10 is what is termed as a serial-scan type printing apparatus that ejects ink from a print head, which moves in the X direction, onto a print medium, which is conveyed in the Y direction, there is not such a limitation. That is, what is termed as a full-line type print head, which uses a long print head extending over the whole area in the width direction of the printing area in a print medium, can be used as well.

(5) Although whether or not the liquid surface height of the ink stored in the ink chamber 38 is below a predetermined position is determined with the pivot member 48 and the sensor 52 in the above-described embodiment, the configuration for detecting the amount of ink in the ink chamber 38 is not limited as such. That is, such a configuration with a sensor capable of detecting the moving amount of the detected part 60 from a reference position, in which the remaining amount of the ink stored in the ink chamber 38 is detected in a stepwise or continuous manner, based on the moving amount of the detected part 60, is also possible. Note that, as explained in the above-described embodiment, the buoyancy generated in the pivot member 48 differs according to the specific gravity of ink. Therefore, the moving amount of the detected part 60 also differs according to the specific gravity of ink. Therefore, in this case, it is also possible that coefficients corresponding to the specific gravities of inks are prepared, so that the remaining amounts of inks are calculated by multiplying the coefficients by the moving amounts of the detected part 60 from the reference position.

(6) Although the above-described embodiment has the configuration in which the detected part 60 is installed via the arm part 58 on one end side (downstream side in the +Y direction) of the float 56 in the pivot member 48, there is not such a limitation. That is, it is also possible that the detected part 60 is installed via the arm part 58 on the other end side (upstream side in the +Y direction) of the float 56 in the pivot member 48. Further, in the above-described embodiment, although the pivot member 48 gets in a state where the detected part 60 is retracted from between the light-receiving part and the light-emitting part of the sensor 52 in a case where the liquid surface height of the ink falls below the predetermined position, there is not such a limitation. That is, regarding the pivot member 48, it is also possible that the detected part 60 is positioned between the light-receiving part and the light-emitting part of the sensor 52 in a case where the liquid surface height of the ink falls below a predetermined position. Further, in the above-described embodiment, although the ink storage part 32 is configured with the two members, i.e., the ink chamber 38 and the ink containing member 36, there is not such a limitation, and it is also possible that the ink storage part 32 is configured with one member equipped with the pivot member 48 and the sensor 52.

(7) The above-described embodiment and various forms shown in (1) through (6) may be combined as appropriate.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-068795, filed Apr. 19, 2022, which is hereby incorporated by reference wherein in its entirety.

What is claimed is:

1. A liquid ejection apparatus comprising:

a first liquid ejection head configured to eject a first liquid;

a first storage unit configured to store the first liquid to be supplied to the first liquid ejection head;

a second liquid ejection head configured to eject a second liquid with a specific gravity that is different from that of the first liquid; and a second storage unit configured to store the second liquid to be supplied to the second liquid ejection head, the first storage unit including:

a first pivot member configured to be revolvable according to an amount of the stored first liquid; and a first detection unit configured to detect the amount of the first liquid by use of the first pivot member, the second storage unit including:

a second pivot member configured to be revolvable according to an amount of the stored second liquid and to move by pivotal movement in a same direction as the first pivot member; and a second detection unit configured to detect the amount of the second liquid by use of the second pivot member, wherein an arrangement position of the first detection unit is different from that of the second detection unit in the direction in which the first pivot member and the second pivot member are moved by pivotal movement, wherein the first pivot member includes a first float configured to have a lower specific gravity than that of the first liquid, and a first detected part installed on the first float via a first arm part and configured to be detectable by the first detection unit, wherein the second pivot member includes a second float configured to have a lower specific gravity than that of the second liquid, and a second detected part installed on the second float via a second arm part and configured to be detectable by the second detection unit, wherein a movement direction in which the first detected part moves according to pivotal movement of the first pivot member is a same movement direction in which the second detected part moves according to pivotal movement of the second pivot member, and wherein the arrangement position of the first detection unit in the first storage unit and the arrangement position of the second detection unit in the second storage unit are different in the movement direction.

2. The liquid ejection apparatus according to claim 1, wherein the first detection unit detects that a height of a liquid surface of the first liquid stored in the first storage unit is below a predetermined position, based on pivotal movement of the first pivot member, and wherein the second detection unit detects that a height of a liquid surface of the second liquid stored in the second storage unit has fallen below the predetermined position, based on pivotal movement of the second pivot member.

3. The liquid ejection apparatus according to claim 1, wherein, the first detection unit is located further to one side in the movement direction of the first detected part which moves according to pivotal movement of the first pivot member caused by decrease of the first liquid, and wherein, the second detection unit is located at one side in the movement direction of the second detected part which moves according to pivotal movement of the second pivot member caused by decrease of the second liquid.

4. The liquid ejection apparatus according to claim 1, wherein the first detected part is formed so as to extend in the movement direction from a position connecting to the first arm part, and wherein the second detected part is formed so as to extend in the movement direction from a position connecting to the second arm part.

5. The liquid ejection apparatus according to claim 1, wherein the first detected part is formed so as to extend, from a position connecting to the first arm part, to one side in the movement direction of the first detected part, and wherein the second detected part is formed so as to extend, from a position connecting to the second arm part, to one side in the movement direction of the second detected part.

6. The liquid ejection apparatus according to claim 1, wherein the first detection unit and the second detection unit are fixed to any of a plurality of fixation portions installed along the movement direction.

7. The liquid ejection apparatus according to claim 1, wherein the first storage unit includes a first chamber configured to store the first liquid and a first containing member configured to be removable from the first chamber and contain the first liquid to be supplied to the first chamber, wherein the first containing member is mounted on the first chamber, and the first liquid contained in the first containing member flows into the first chamber, wherein the second storage unit includes a second chamber configured to store the second liquid and a second containing member configured to be removable from the second chamber and contain the second liquid to be supplied to the second chamber, and wherein the second containing member is mounted on the second chamber, and the second liquid contained in the second containing member flows into the second chamber.

8. The liquid ejection apparatus according to claim 7, wherein the first pivot member is installed in the first chamber, and wherein the second pivot member is installed in the second chamber.

* * * * *